US012554211B2

(12) United States Patent
Sakamoto et al.

(10) Patent No.: US 12,554,211 B2
(45) Date of Patent: Feb. 17, 2026

(54) IMAGE FORMING APPARATUS

(71) Applicant: CANON KABUSHIKI KAISHA, Tokyo (JP)

(72) Inventors: Yusuke Sakamoto, Tokyo (JP); Yusuke Shimizu, Kanagawa (JP); Shunsuke Mizukoshi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/595,651

(22) Filed: Mar. 5, 2024

(65) Prior Publication Data

US 2024/0302765 A1 Sep. 12, 2024

(30) Foreign Application Priority Data

Mar. 10, 2023 (JP) ................................. 2023-038052

(51) Int. Cl.
*G03G 15/02* (2006.01)
*G03G 15/01* (2006.01)
*G03G 21/16* (2006.01)

(52) U.S. Cl.
CPC ..... *G03G 15/0216* (2013.01); *G03G 15/0189* (2013.01); *G03G 21/168* (2013.01); *G03G 2215/00632* (2013.01); *G03G 2215/00776* (2013.01)

(58) Field of Classification Search
CPC ....................... G03G 15/1675; G03G 15/0266
See application file for complete search history.

(56) References Cited

U.S. PATENT DOCUMENTS

| | | | | |
|---|---|---|---|---|
| 11,099,496 | B2 * | 8/2021 | Kobayashi | G03G 15/0225 |
| 11,435,675 | B2 | 9/2022 | Kanai et al. | |
| 2018/0275569 | A1 * | 9/2018 | Uehara | G03G 15/1675 |
| 2019/0354043 | A1 * | 11/2019 | Odagiri | G03G 15/1665 |
| 2020/0341404 | A1 * | 10/2020 | Toda | G03G 15/0266 |
| 2024/0168405 | A1 | 5/2024 | Shimizu et al. | |

FOREIGN PATENT DOCUMENTS

| | | | |
|---|---|---|---|
| JP | 10-78712 | A | 3/1998 |
| JP | 2006-163347 | A | 6/2006 |
| JP | 2018-132673 | A | 8/2018 |
| JP | 2020-160361 | A | 10/2020 |

OTHER PUBLICATIONS

U.S. Appl. No. 18/661,191, Tomoo Akizuki Yusuke Shimizu Shunsuke Mizukoshi, filed May 10, 2024.

* cited by examiner

*Primary Examiner* — Jessica L Eley
(74) *Attorney, Agent, or Firm* — Venable LLP

(57) ABSTRACT

In post-rotation control of removing an electric charge from a surface of an image bearing member in a state that the image bearing member and a developing member rotate while in contact with each other, in a case that the post-rotation control is started in a state that a recording medium is being conveyed by the image bearing member and a transfer member, i) a control portion controls a transfer voltage applying portion so as to apply a first transfer voltage in a case that the recording medium is being sandwiched between the image bearing member and the transfer member, and ii) the control portion controls the transfer voltage applying portion so as to apply a second transfer voltage that is lower than the first transfer voltage after the recording medium passes through a sandwiching portion.

12 Claims, 6 Drawing Sheets

IMAGE FORMING APPARATUS

BACKGROUND OF THE INVENTION

Field of the Invention

The present invention relates to an image forming apparatus. In particular, the present invention relates to an electrophotographic image forming apparatus which forms an image on a recording medium by using an electrophotographic forming system.

Description of the Related Art

Conventionally, in an image forming apparatus such as an electrophotographic printer, an image forming apparatus adopting a contact developing system is known. In the image forming apparatus adopting a contact developing system, image formation is performed in a state where a developing member and an image bearing member are in contact with each other.

In the configuration described above, a phenomenon in which a developer such as toner is transferred from the developing member to a non-image forming portion of the image bearing member is called fogging. Fogging is particularly likely to occur in an image forming apparatus configured such that the developing member is constantly in contact with the image bearing member. Japanese Patent Application Laid-open No. 2020-160361 discloses a configuration in which, in order to suppress fogging, a surface potential of a photosensitive drum, which is an image bearing member, is made to transition to 0 V while maintaining a constant potential difference between a developing roller, which is a developing member, and the photosensitive drum when executing post-rotation control after image formation.

SUMMARY OF THE INVENTION

However, in the configuration described above, when the post-rotation control is started while a recording medium is being conveyed by the photosensitive drum and a transfer roller, a transfer current which flows through the photosensitive drum when the recording medium exits from between the photosensitive drum and the transfer roller increases. Accordingly, when the photosensitive drum comes into contact with the developing roller and the photosensitive drum and the developing roller rotate during execution of the post-rotation control, the phenomenon described below may occur particularly in an image forming apparatus incapable of separating the developing roller from the photosensitive drum. Due to an inability to keep the potential difference between the photosensitive drum and the developing roller at an appropriate value during the post-rotation control, fogging may occur.

In order to solve the problem described above, an object of the present invention is to provide an image forming apparatus capable of appropriately controlling a potential difference between a photosensitive drum and a developing roller when the photosensitive drum and the developing roller rotate.

In order to achieve the object described above, an image forming apparatus according to the present application includes:

a rotatable image bearing member;

a charging member which charges a surface of the image bearing member;

a developing member which supplies a developer to the image bearing member;

a transfer member which transfers a developer image formed on the surface of the image bearing member onto a recording medium by sandwiching the recording medium with the image bearing member at a sandwiching portion;

a transfer voltage applying portion which applies a transfer voltage to the transfer member; and a control portion which controls the transfer voltage applying portion, wherein the image forming apparatus is capable of executing post-rotation control of removing an electric charge from the surface of the image bearing member in a state that the image bearing member and the developing member rotate while in contact with each other, wherein in a case that the post-rotation control is started in a state that a recording medium is being conveyed by the image bearing member and the transfer member, i) the control portion controls the transfer voltage applying portion so as to apply a first transfer voltage to the transfer member in a case that the recording medium is being sandwiched between the image bearing member and the transfer member, and ii) the control portion controls the transfer voltage applying portion so as to apply a second transfer voltage to the transfer member that is lower than the first transfer voltage after the recording medium passes through the sandwiching portion.

According to the present invention, an image forming apparatus capable of appropriately controlling a potential difference between a photosensitive drum and a developing roller when the photosensitive drum and the developing roller rotate can be provided.

Further features of the present invention will become apparent from the following description of exemplary embodiments with reference to the attached drawings.

DESCRIPTION OF THE EMBODIMENTS

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments are not intended to limit the scope of the invention to the following embodiments. In addition, not all features described in the following embodiments are essential to solutions provided by the invention.

Hereinafter, a case where the present invention is applied to an image forming apparatus adopting an electrophotographic image forming system which forms an image on a recording medium using an electrophotographic image forming process will be described. Examples of image forming apparatuses adopting an electrophotographic image forming system include an electrophotographic copier, an electrophotographic printer (such as an LED printer and a laser beam printer), and an electrophotographic facsimile apparatus.

First Embodiment

Image Forming Apparatus

Figure 1:
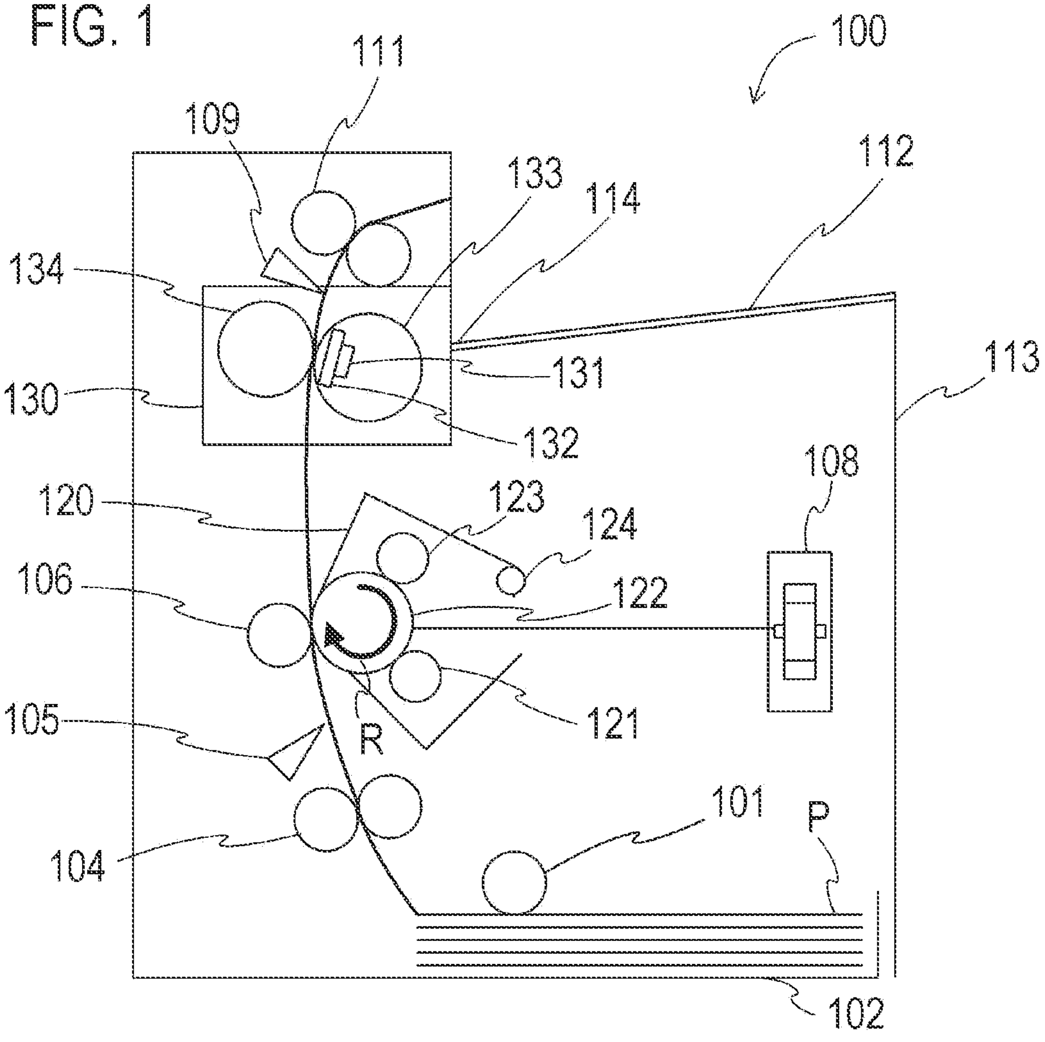
FIG. 1 is a schematic sectional view showing an overall configuration of an image forming apparatus according to a first embodiment.

First, an overall configuration of an image forming apparatus 100 according to a first embodiment of the present invention will be described with reference to FIG. 1. FIG. 1 is a schematic sectional view of the image forming apparatus 100 according to the first embodiment. The image forming apparatus 100 is mainly constituted of an image forming portion, a fixing portion, a sheet feeding portion, and a sheet discharging portion.

The image forming portion of the image forming apparatus 100 includes a photosensitive drum 122 as an image bearing member, a charging roller 123 as a charging member which charges the photosensitive drum 122, and a developing roller 121 as a developing member which supplies the photosensitive drum 122 with a toner (developer). The image forming portion further includes a supplying roller 124 which supplies the developing roller 121 with the toner, a scanner portion 108 which irradiates the photosensitive drum 122 with laser light corresponding to image information, and a transfer roller 106 as a transfer member which forms a transfer nip together with the photosensitive drum 122. The photosensitive drum 122, the charging roller 123, the developing roller 121, the supplying roller 124, and the transfer roller 106 are configured to be rotatable around mutually parallel rotational axes.

The photosensitive drum 122 is formed of an organic photosensitive member or an amorphous silicon photoreceptor and is rotationally driven at a prescribed peripheral velocity (process speed) in a direction of an arrow R (clockwise direction) in FIG. 1 during an image forming operation. The charging roller 123 uniformly charges a surface (peripheral surface) of the photosensitive drum 122 to a prescribed polarity and potential. In addition, by irradiating the charged surface with laser light output from the scanner portion 108, scanning exposure is performed and an electrostatic latent image corresponding to the image information is formed. A voltage is respectively applied to both the developing roller 121 and the supplying roller 124 and the developing roller 121 receives supply of the toner from the supplying roller 124 by being rotationally driven in a state of a uniform potential. The electrostatic latent image formed on the surface of the photosensitive drum 122 so as to correspond to an object image in this manner is developed by the developing roller 121 and a toner image (developer image) is formed on the surface of the photosensitive drum 122. In the first embodiment, a mechanism for causing the developing roller 121 to come into contact with and/or to separate from the photosensitive drum 122 is not provided and the image forming apparatus 100 is configured such that the developing roller 121 is always in contact with the photosensitive drum 122 even when an image forming operation is not being performed.

A fixing unit 130 as a fixing portion of the image forming apparatus 100 includes a heater 132 as a heat source, a fixing film 133, and a pressure roller 134 which forms a fixing nip together with the heater 132 via the fixing film 133. In addition, the sheet feeding portion of the image forming apparatus 100 includes a sheet feeding roller 101 which feeds a sheet P as a recording medium from a sheet feeding tray 102 and a resist roller 104 which conveys the sheet P fed by the sheet feeding roller 101 to the transfer nip. Furthermore, the sheet discharging portion of the image forming apparatus 100 includes a sheet discharge roller 111 which discharges the sheet P having exited the fixing nip to a sheet discharge tray 112. In addition, as sensors which detect passage of the sheet P, the image forming apparatus 100 is provided with a first sensor 105 on an upstream side in a conveying direction of the transfer nip and a second sensor 109 on a downstream side in the conveying direction of the transfer nip.

When the sheet P is fed from the sheet feeding tray 102 in an image forming operation, the sheet P is fed by the sheet feeding roller 101 and sent into a sandwiching portion (transfer nip) constituted of the photosensitive drum 122 and the transfer roller 106 by the resist roller 104. The toner image formed on the surface of the photosensitive drum 122 is transferred onto the sheet P by the transfer roller 106 and a mirror toner image is formed on a face which faces the side of the photosensitive drum 122 of the sheet P. The transfer roller 106 transfers the toner image from the photosensitive drum 122 onto the sheet P by supplying a charge having a reverse polarity with respect to the toner from a rear surface (surface on an opposite side to a toner image formation surface) of the sheet P. The sheet P onto which the toner image has been transferred is separated from the photosensitive drum 122 and sent into the fixing unit 130 to be subjected to heat fixing of the toner image by the heater 132, the fixing film 133, and the pressure roller 134. The sheet P having been subjected to heat fixing is conveyed by the sheet discharge roller 111 and discharged to the sheet discharge tray 112.

System Configuration

Figure 2:
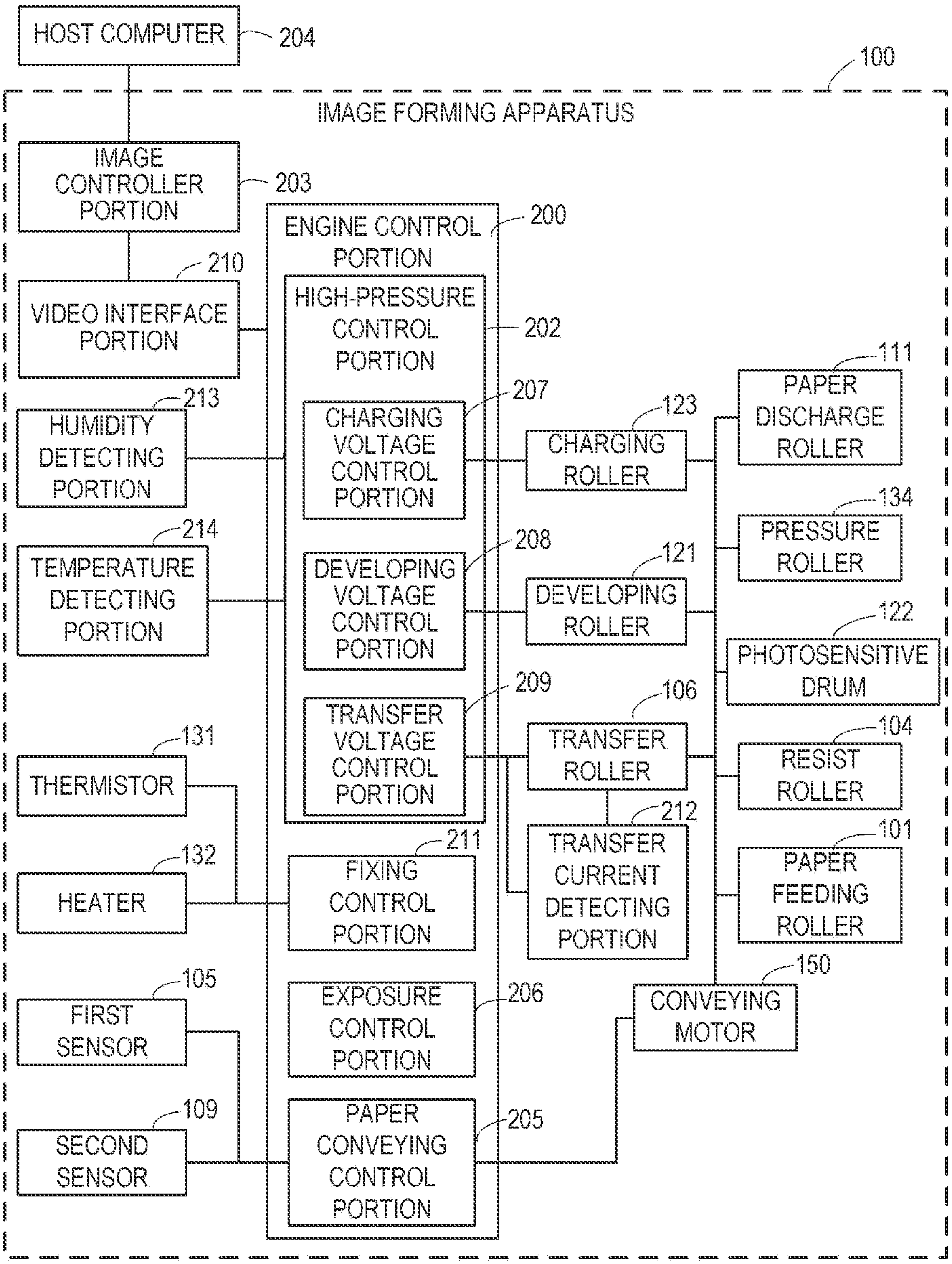
FIG. 2 is a block diagram of a control system according to the first embodiment.

Next, a system configuration (control system) of the image forming apparatus 100 will be described with reference to FIG. 2. FIG. 2 is a block diagram for describing the system configuration of the image forming apparatus 100. In FIG. 2, the image forming apparatus 100 controls each component through an engine control portion 200. The engine control portion 200 is constituted of a plurality of control portions including a fixing control portion 211, an exposure control portion 206, a high-pressure control portion 202, and a sheet conveying control portion 205. An image controller portion 203 is capable of mutually communicating with the engine control portion 200 through a video interface portion 210.

A host computer 204 which is an external apparatus transmits print conditions, image data of a print image, and a print command to the image controller portion 203 of the image forming apparatus 100. The image controller portion 203 converts the image data received from the host computer 204 into exposure data required by the image forming apparatus 100 and, at the same time, creates print reservation information for each sheet based on the received print conditions. The print reservation information represents, for example, a print mode or the like for setting image formation conditions in accordance with a sheet feeding port (sheet feeding tray) indicating a supply source of a sheet P, a size of the sheet, and a type of the sheet P (for example, standard sheet, heavy sheet, or thin sheet). The image controller portion 203 transmits a print reservation instruction to the engine control portion 200 via the video interface portion 210, and when conversion of the image data into the exposure data is completed, transmits a print start instruction to the engine control portion 200. When the engine control portion 200 receives the print start instruction from the image controller portion 203, the engine control portion 200 starts a print operation.

The sheet conveying control portion 205 of the engine control portion 200 rotationally drives the plurality of rollers of the image forming apparatus 100 using a conveying motor 150. The conveying motor 150 which is controlled by the sheet conveying control portion 205 rotationally drives the sheet feeding roller 101, the resist roller 104, the photosensitive drum 122, the charging roller 123, the developing roller 121, the transfer roller 106, the pressure roller 134, and the sheet discharge roller 111. The conveying motor 150 and the sheet feeding roller 101 are connected via a sheet feeding clutch (not illustrated), and when the sheet P is fed from a sheet feeding cassette, the sheet feeding clutch is coupled for a prescribed period of time to rotationally drive the sheet feeding roller 101 with the conveying motor 150.

The exposure control portion 206 controls a rotation of a scanner motor (not illustrated) of the scanner portion 108 or controls correction of an amount of exposure light to control radiation of light to the photosensitive drum 122 based on exposure data received from the image controller portion 203.

The high-pressure control portion 202 performs control of a power supply to apply a DC voltage or an AC voltage or both a DC voltage and an AC voltage using respective voltage control portions corresponding to respective members in the image forming apparatus 100. In this case, the respective members include the charging roller 123, the developing roller 121, and the transfer roller 106 and the respective voltage control portions include a charging voltage control portion 207, a developing voltage control portion 208, and a transfer voltage control portion 209. The charging voltage control portion 207 controls a charging voltage applying portion such as a bias power supply which applies a charging voltage to the charging roller 123. In a similar manner, the developing voltage control portion 208 controls a developing voltage applying portion such as a bias power supply which applies a developing voltage to the developing roller 121, and the transfer voltage control portion 209 controls a transfer voltage applying portion such as a bias power supply which applies a transfer voltage to the transfer roller 106. A transfer current detecting portion 212 samples a value of a current flowing through the transfer roller 106 and the high-pressure control portion 202 feeds back the current value to the transfer voltage control portion 209 when necessary. The high-pressure control portion 202 may be configured to be capable of calculating an absolute humidity in accordance with detection results of a humidity detecting portion 213 and a temperature detecting portion 214 and changing an output of each voltage control portion in accordance with the absolute humidity. In the present embodiment, the charging voltage control portion 207, the developing voltage control portion 208, and the transfer voltage control portion 209 respectively apply DC voltage.

The fixing control portion 211 detects a surface temperature of the heater 132 with a thermistor 131 and controls power supply to the heater 132 based on a detection result.

Voltage Control During Post-Rotation Control

Figures 3A, 3B, 3C:
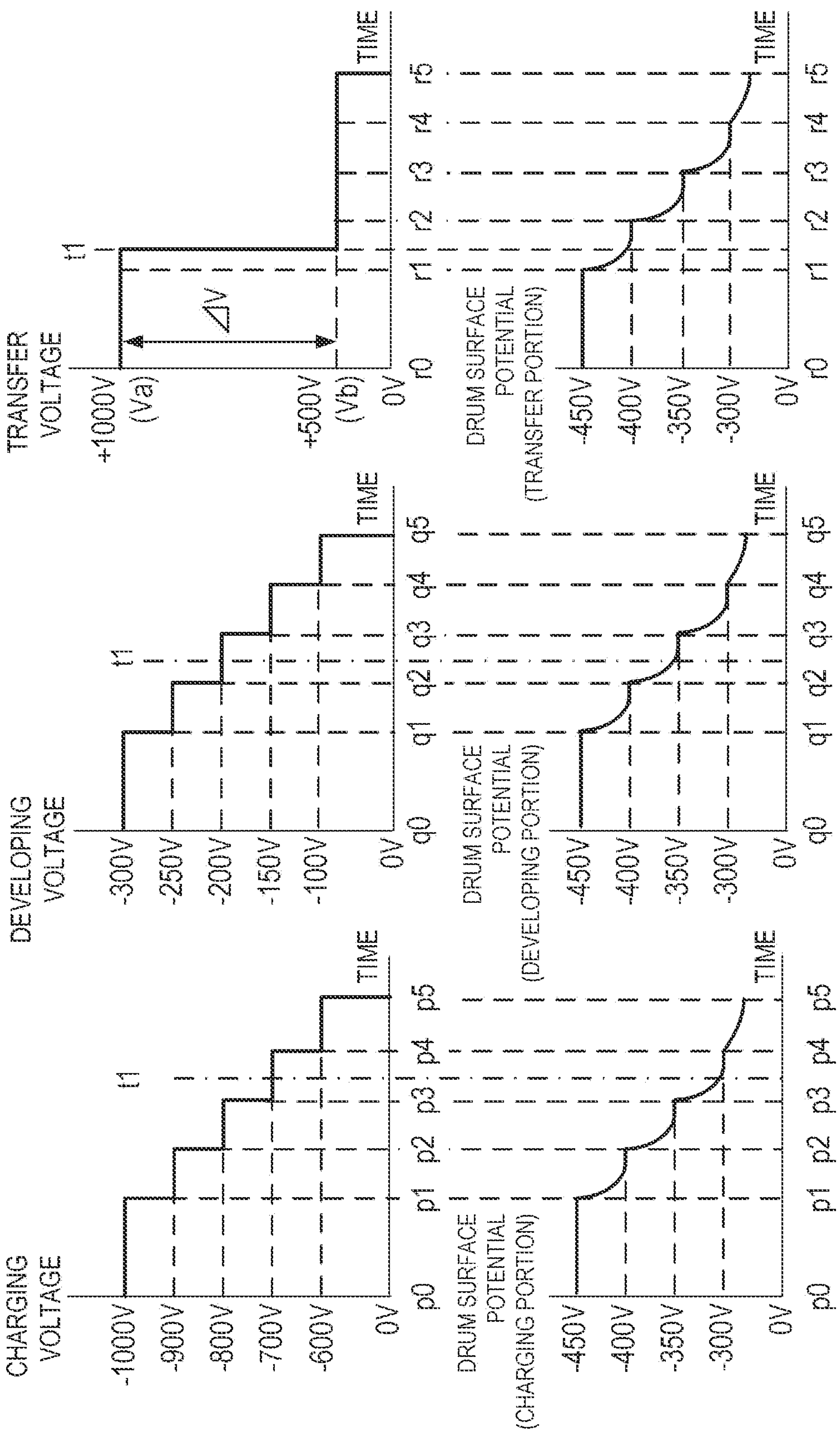
FIGS. 3A to 3C are timing charts during post-rotation control according to the first embodiment.

Voltage control during post-rotation control according to the present embodiment will be described based on an operation example with reference to FIGS. 3A to 3C. FIGS. 3A to 3C are diagrams representing timing charts from during an image forming operation to engine stop. An ordinate of the timing chart shown in an upper part of each diagram represents various voltages (charging voltage, developing voltage, and transfer voltage), and an ordinate of the timing chart shown in a lower part of each diagram represents a surface potential of the photosensitive drum 122 in various high-pressure portions (charging portion, developing portion, and transfer portion). In addition, an abscissa of each timing chart represents time with the start of the post-rotation control as a starting point.

In the post-rotation control, in order to prepare for a next image formation job, each voltage control portion is controlled so that the high-pressure control portion 202 removing an electric charge from the surface of the photosensitive drum 122. Due to the execution of the post-rotation control, a potential difference Vk (Vback) between the developing roller 121 and the photosensitive drum 122 can be controlled to a proper range in each image formation job. In an operation example to be described below, the post-rotation control is started in a state where the sheet P is sandwiched between the photosensitive drum 122 and the transfer roller 106 in order to reduce rotation time of the photosensitive drum 122. Note that the post-rotation control refers to control until the output of the various bias power supplies for applying voltages is reduced and rotation operations of the various rollers are stopped. In the present operation example, the post-rotation control is started when a development operation in which an electrostatic latent image is developed on the photosensitive drum 122 by the developing roller 121 is finished.

Charging Voltage Control

First, a control method of the charging voltage in an operation example of the post-rotation control will be described. An upper part of FIG. 3A shows a transition of charging voltage applied to the charging roller 123 and a lower part of FIG. 3A shows a transition of surface potential of a charging portion (a contact position with the charging roller 123) of the photosensitive drum 122. In addition, an abscissa of the timing chart shown in FIG. 3A shows p0 representing a timing at start of the post-rotation control and p1, p2, p3, p4, and p5 representing prescribed timings after p0.

As shown in the upper part of FIG. 3A, during the post-rotation control, the charging voltage control portion 207 changes, in stages, a charging voltage applied to the charging roller 123. At the start of the post-rotation control, the charging voltage control portion 207 continuously applies a charging voltage of −1000 V which is the same value as during an image forming operation. In addition, the charging voltage control portion 207 changes the charging voltage by +100 V at p1 being an end timing of image formation and subsequently changes the charging voltage by +100 V every 100 ms from p1 to p4. In other words, the charging voltage is controlled to −1000 V from p0 to p1, to −900 V from p1 to p2, to −800 V from p2 to p3, to −700 V from p3 to p4, and to −600 V from p4 to p5. Subsequently, charging voltage output is continued until p5 being an end timing of the post-rotation control and the charging voltage changes to 0 V at p5.

As shown in the lower part of FIG. 3A, the surface potential of the photosensitive drum 122 in the charging portion is −450 V at the start of the post-rotation control and a potential difference of 550 V that is a discharge threshold is maintained with respect to the charging voltage. In addition, after p1, the surface potential in the charging portion of the photosensitive drum 122 gradually changes so as to follow the charging voltage.

Developing Voltage Control

Next, a control method of the developing voltage in the present operation example will be described. An upper part of FIG. 3B shows a transition of developing voltage applied to the developing roller 121 and a lower part of FIG. 3B shows a transition of surface potential of a developing portion (a contact position with the developing roller 121) of the photosensitive drum 122. In addition, an abscissa of the timing chart shown in FIG. 3B shows q0 which is a same timing as p0 representing a timing at start of the post-rotation control and q1, q2, q3, q4, and q5 representing prescribed timings after q0.

As shown in the upper part of FIG. 3B, during the post-rotation control, the developing voltage control portion 208 changes, in stages, a developing voltage applied to the developing roller 121 in synchronization with the charging voltage in order to maintain the potential difference Vk between the developing roller 121 and the photosensitive drum 122 within a prescribed range. In the present operation example, the developing voltage at the start of the post-rotation control is −300 V and the potential difference Vk is 150 V. In addition, the developing voltage control portion 208 changes the developing voltage by +50 V at q1 and subsequently changes the developing voltage by +50 V every 100 ms from q1 to q4. In other words, the developing voltage is controlled to −300 V from q0 to q1, to −250 V from q1 to q2, to −200 V from q2 to q3, to −150 V from q3 to q4, and to −100 V from q4 to q5. Subsequently, developing voltage output is continued until q5 being an end timing of the post-rotation control and the developing voltage changes to 0 V at q5.

The timing q1 at which the change in developing voltage starts is a timing where the surface of the photosensitive drum 122 having been positioned in the charging portion at p1 reaches the developing portion. In other words, from p1 to q1 is a period of time required by a portion having been in contact with the charging roller 123 of the surface of the photosensitive drum 122 to come into contact with the developing roller 121 in accordance with a rotation of the photosensitive drum 122. A relationship between p2 to p5 and q2 to q5 is similar to the relationship between p1 and q1.

As shown in the lower part of FIG. 3B, the surface potential of the photosensitive drum 122 in the developing portion is −450 V at the start of the post-rotation control and the potential difference Vk between the developing roller 121 and the photosensitive drum 122 is maintained at 150 V. In addition, after q1, the surface potential in the developing portion of the photosensitive drum 122 gradually changes with a lag from the charging portion.

Due to the developing voltage being controlled as described above, the potential difference Vk between the photosensitive drum 122 and the developing roller 121 is maintained at approximately 150 V even if the charging voltage changes and transfer of the toner (fogging) from the developing roller 121 to the non-image forming portion of the photosensitive drum 122 is suppressed.

However, when the post-rotation control is started while the sheet P is being conveyed to the photosensitive drum 122 and the transfer roller 106, a resistance value between the photosensitive drum 122 and the transfer roller 106 decreases at a timing where the sheet P passes through the sandwiching portion (transfer nip). When a transfer current that flows through the photosensitive drum 122 increases with the decrease in the resistance value, the potential difference Vk is not maintained at an appropriate value and fogging may occur. In consideration thereof, in the first embodiment, in order to prevent the transfer current from increasing, the transfer voltage control portion 209 reduces a transfer voltage applied to the transfer roller 106 at a timing where the sheet P passes through the transfer nip. Hereinafter, details of the control method of the transfer voltage during the post-rotation control in an operation example of the image forming apparatus 100 will be described.

Transfer Voltage Control

A control method of the transfer voltage in the present operation example will be described. An upper part of FIG. 3C shows a transition of transfer voltage applied to the transfer roller 106 and a lower part of FIG. 3C shows a transition of surface potential of a transfer portion (a contact position with the transfer roller 106) of the photosensitive drum 122. In addition, an abscissa of the timing chart shown in FIG. 3C shows r0 which is a same timing as p0 representing a timing at start of the post-rotation control and r1, r2, r3, r4, and r5 representing prescribed timings after r0.

As shown in FIG. 3C, at the start of the post-rotation control, the transfer voltage control portion 209 sets the transfer voltage to a first transfer voltage Va. The first transfer voltage Va is a transfer voltage during the constant current control before the sheet P reaches the transfer nip in an image forming operation and, in the present operation example, Va=1000 V. In addition, the transfer voltage control portion 209 reduces the transfer voltage at a timing t1 where the sheet P passes through the transfer nip formed by the photosensitive drum 122 and the transfer roller 106. In the first embodiment, an offset voltage ΔV being an amount of change (an amount of decrease) of the transfer voltage is 500 V. In other words, at t1, the transfer voltage control portion 209 changes the transfer voltage from +1000 V (first transfer voltage Va) to +500 V (second transfer voltage Vb). Subsequently, transfer voltage output is continued until r5 being an end timing of the post-rotation control and the transfer voltage changes to 0 V at r5. Details of a method of calculating the offset voltage ΔV will be provided later.

Note that the timing r1 is a timing where the surface of the photosensitive drum 122 having been positioned in the charging portion at p1 reaches the transfer portion. In other words, from p1 to r1 is a period of time required by a portion having been in contact with the charging roller 123 of the surface of the photosensitive drum 122 to come into contact with the transfer roller 106 in accordance with a rotation of the photosensitive drum 122. A relationship between p2 to p5 and r2 to r5 is similar to the relationship between p1 and r1.

Figure 4B:
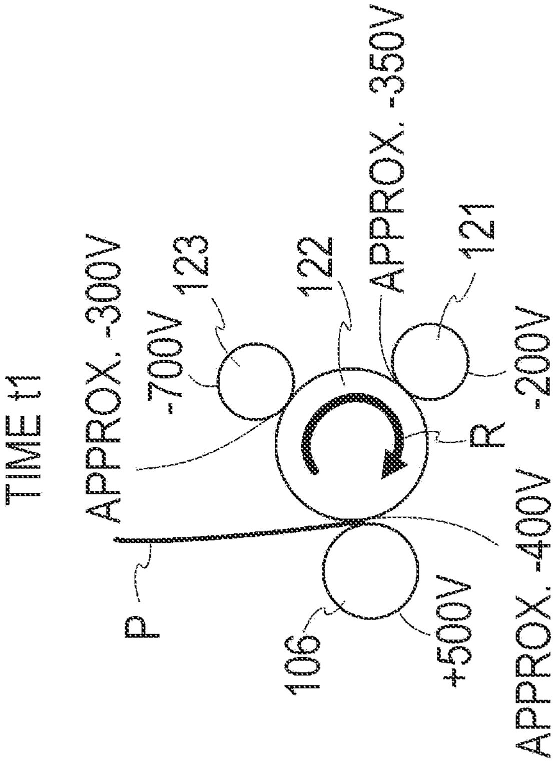
FIGS. 4A and 4B are schematic views showing each voltage and a state of surface potential of a photosensitive drum according to the first embodiment.
Figure 4A:
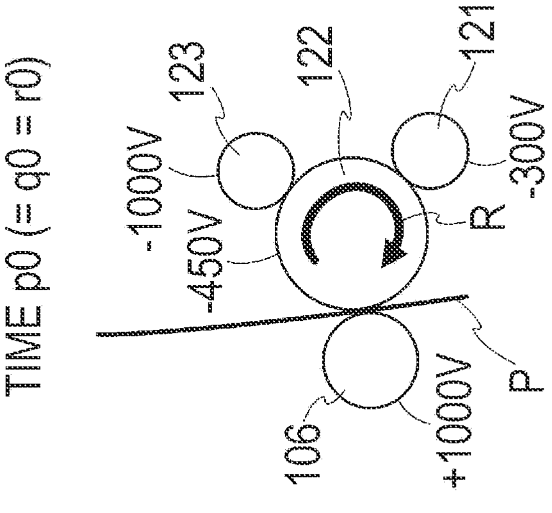

FIG. 4A is a schematic view showing each voltage and a surface potential of the photosensitive drum 122 at p0 (=q0=r0) which is a timing where the post-rotation control is started. FIG. 4B is a schematic view showing each voltage and a surface potential of the photosensitive drum 122 at t1 which is a timing where the sheet P passes through the transfer nip. As described above, at the start of the post-rotation control (p0), an image forming operation is in progress and the sheet P is being sandwiched between and conveyed by the photosensitive drum 122 and the transfer roller 106. The surface potential over the entire surface of the photosensitive drum 122 at this point is −450 V, the charging voltage is −1000 V, the developing voltage is −300 V, and the transfer voltage is +1000 V (first transfer voltage Va).

On the other hand, the timing (t1) at which the sheet P passes through the transfer nip is after p3 and before p4, after q2 and before q3, and after r1 and before r2. In addition, at t1, the surface potential of the charging portion of the photosensitive drum 122 is approximately −300 V, the surface potential of the developing portion is approximately −350 V, and the surface potential of the transfer portion is approximately −400 V. Furthermore, at t1, the charging voltage is −700 V, the developing voltage is −200 V, and the transfer voltage is switched from +1000 V (first transfer voltage Va) to +500 V (second transfer voltage Vb). Note that an anteroposterior relationship between t1 described above and other timings is merely an example and the position of t1 in FIGS. 3A to 3C may vary depending on a rotational speed of the photosensitive drum 122 and the like. For example, when t1 is after p3 and before p4, t1 is not limited to being after q2 and may be the same timing as q2 or before q2. Alternatively, t1 may be before q4 and after q3. In a similar manner, when t1 is after p3 and before p4, t1 may be the same timing as r1 or before r1 or may be before r4 and after r3. In other words, q3 and r3 are timings that are always after p3. However, q1, q2, r1, and r2 may be timings that are before p3 or after p3.

In the first embodiment, the offset voltage ΔV that is an amount of decrease of the transfer voltage is acquired by the following expression (Math. 1) based on an average value of the transfer voltage during the constant current control and a target value of a transfer current. The transfer current is a current which flows through the photosensitive drum 122 via the transfer roller 106 in a state where the transfer voltage is being applied to the photosensitive drum 122. More specifically, the offset voltage ΔV is calculated based on an average voltage value (first transfer voltage Va) and a target current value (first current value Ia) of a first operation of the constant current control and an average voltage value (third transfer voltage Vc) and a target current value (third current value Ic) of a second operation of the constant current control. The first operation is a mode of the constant current control which is executed before the sheet P reaches the transfer nip and which is basically executed when the sheet P is not positioned between the photosensitive drum 122 and the transfer roller 106. The second operation is a mode of the constant current control which is executed when the sheet P is being subjected to image formation and which is basically executed when the sheet P is positioned between the photosensitive drum 122 and the transfer roller 106. In other words, during an image forming operation, as the constant current control, the second operation is executed after the first operation is executed. In addition, in the first embodiment, Ia=10 μA and Va=1000 V in the first operation and Ic=20 μA and Vc=2500 V in the second operation, and the offset voltage ΔV is calculated by the following expression (Math. 1) as 500 V. Furthermore, the second transfer voltage Vb is determined by subtracting the offset voltage ΔV from the first transfer voltage Va as 1000 V−500 V=500 V.

$$\Delta V = Vc - (Va/Ia) \times Ic \qquad \text{(Math. 1)}$$

When the transfer voltage has not been offset and is constant, since the resistance value between the photosensitive drum 122 and the transfer roller 106 decreases and the transfer current increases at a timing where the sheet P passes through the transfer nip, the surface potential of the transfer portion of the photosensitive drum 122 changes to a positive side (a downward direction in FIG. 3C). As a result, due to the surface potential of the photosensitive drum 122 not decreasing sufficiently in the charging portion, there is a risk that the potential difference Vk cannot be maintained and fogging may occur.

On the other hand, according to the configuration of the first embodiment, the transfer voltage is continuously applied during the post-rotation control and the transfer voltage is offset at a timing where a rear end of the sheet P passes through the transfer nip and the transfer voltage decreases. In other words, the voltage applied by the transfer voltage control portion 209 to the transfer roller 106 is the first transfer voltage Va until the sheet P reaches the transfer nip and the third transfer voltage Vc during image formation. In addition, the voltage applied by the transfer voltage control portion 209 to the transfer roller 106 during the post-rotation control is the first transfer voltage Va from the start of the post-rotation control until the sheet P passes through the transfer nip and the second transfer voltage Vb which is lower than the first transfer voltage Va after the sheet P passes through the transfer nip. Due to such control, positive charging of the surface potential of the photosensitive drum 122 in the transfer portion which is a contact position with the transfer roller 106 due to a decrease in the resistance value between the photosensitive drum 122 and the transfer roller 106 during the post-rotation control is suppressed.

Therefore, with the configuration according to the first embodiment, since the post-rotation control can be started before the sheet P completely passes through the transfer nip, a rotation time of the photosensitive drum 122 can be reduced and the lifespan of the photosensitive drum 122 can be extended. Furthermore, since the transfer voltage control portion 209 controls the transfer voltage during the post-rotation control in consideration of the fact that the resistance value between the photosensitive drum 122 and the transfer roller 106 decreases at a timing where the sheet P passes through the transfer nip, an occurrence of fogging can be suppressed.

Operation of Engine Control Portion

Figure 5:
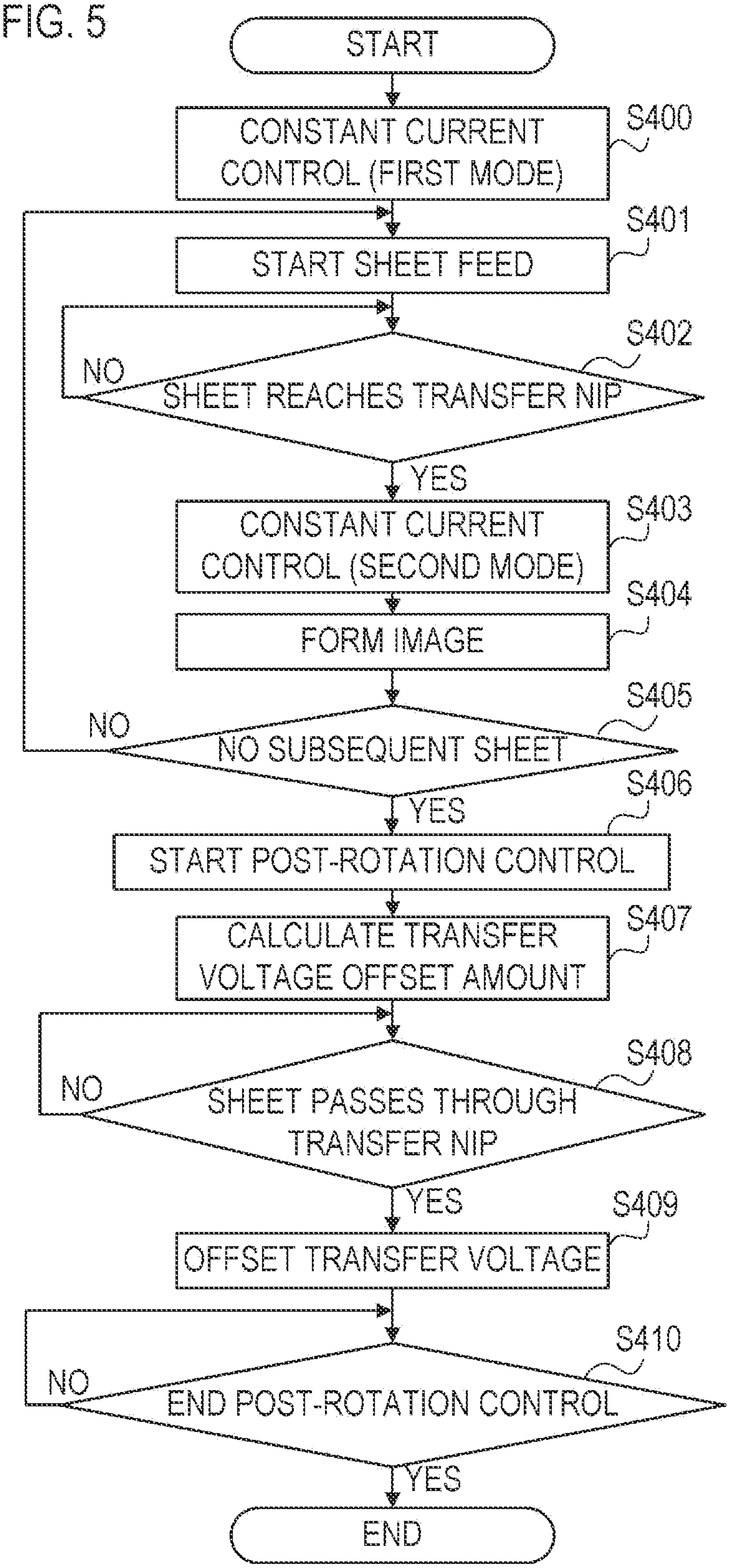
FIG. 5 is a flow chart of operations of a control portion according to the first embodiment.

Next, an operation of the engine control portion 200 according to the first embodiment will be described with reference to FIG. 5. FIG. 5 shows a flow chart of an operation of the engine control portion 200 from feeding of the sheet P to the end of the post-rotation control. The engine control portion 200 operates according to a control program.

The engine control portion 200 starts processing of step (hereinafter, denoted as S) 400 and thereafter shown in FIG. 5 at a timing where a user issues print instructions. After receiving print instructions from the image controller portion 203, in S400, the engine control portion 200 executes the constant current control under conditions of the first operation. The constant current control is control of updating applied transfer voltage at prescribed time intervals so that the transfer current detected by the transfer current detecting portion 212 reaches a target current value set in advance. As the target current value of the first operation of the constant current control, a first current value Ia is set as a current value at which a discharge does not occur on a contact surface between the photosensitive drum 122 and the transfer roller 106. The constant current control in the first operation is executed until the sheet P reaches the transfer nip. The engine control portion 200 calculates the first transfer voltage Va as an average value of transfer voltage during the constant current control in the first operation at the end of the constant current control in the first operation.

When preparation for image formation is completed, the engine control portion 200 starts sheet feed in S401. After the start of sheet feed, the constant current control is performed under conditions of the first operation by the transfer voltage control portion 209 until the sheet P reaches the contact portion (transfer nip) between the photosensitive drum 122 and the transfer roller 106. When the sheet P reaches the transfer nip in S402, in S403, the engine control portion 200 executes the constant current control under the conditions of the second operation as transfer voltage control for image formation. The third current value Ic which is a target current value of the second operation of the constant current control can be set in accordance with environmental information such as characteristics of the sheet P and temperature and humidity around the image forming apparatus 100. The constant current control in the second operation is continuously executed while image formation is being executed in S404. The engine control portion 200 calculates the third transfer voltage Vc as an average value of transfer voltage during the constant current control in the second operation at the end of the constant current control in the second operation.

In S405, the engine control portion 200 determines whether or not there are print instructions for a subsequent sheet. When there are no print instructions for a subsequent sheet, in S406, the engine control portion 200 starts the post-rotation control. In the first embodiment, a timing where the post-rotation control is started is a timing where a development operation in which an electrostatic latent image is developed on the photosensitive drum 122 by the developing roller 121 is finished and is a timing where the sheet P is being conveyed to the photosensitive drum 122 and the transfer roller 106. As described earlier, the transfer voltage is set to the first transfer voltage Va or, in other words, 1000 V at the start of the post-rotation control.

In S407, the engine control portion 200 calculates the offset voltage ΔV according to (Math. 1) as an offset amount of the transfer voltage before the sheet P passes through the transfer nip and, in S408, the engine control portion 200 stands by until the rear end of the sheet P passes through the transfer nip. Subsequently, in S409, the engine control portion 200 reduces the transfer voltage by the offset voltage ΔV calculated according to (Math. 1) and, in S410, the engine control portion 200 stands by until the post-rotation control ends. Note that the calculation of the offset voltage ΔV (S407) is not limited to after the start of the post-rotation control (S406) and, for example, the calculation may be performed at any timing between S404 and S406.

As described above, the image forming apparatus 100 according to the first embodiment acquires the offset voltage ΔV based on an average voltage value and a target current value of the constant current control by the first operation and the second operation and reduces the transfer voltage by an amount corresponding to the offset voltage ΔV at a timing where the sheet P passes through the transfer nip during the post-rotation control. Since an increase in the transfer current that flows through the photosensitive drum 122 is suppressed due to the transfer voltage being offset at a timing where a value of resistance created at the transfer nip decreases, a change of a drum surface potential to a positive side is suppressed. As a result, surface potential is controlled so that the potential difference Vk is maintained in an appropriate range on a downstream side in a rotation direction of the transfer portion of the photosensitive drum 122. Consequently, even in a configuration in which the developing roller 121 is constantly in contact with the photosensitive drum 122, fogging can be suppressed while reducing a rotation time of the photosensitive drum 122.

Second Embodiment

Next, a second embodiment according to the present invention will be described. The second embodiment differs from the first embodiment in a method of calculating the offset voltage ΔV of transfer voltage. Hereinafter, in the description of the second embodiment, components similar to those of the first embodiment will be denoted by same reference characters and descriptions thereof will be omitted, and only characteristic components of the second embodiment will be described. For example, a system configuration of the image forming apparatus 100 according to the second embodiment is similar to that of the first embodiment.

In the first embodiment, control is performed to calculate an offset amount (offset voltage ΔV) of the transfer voltage which is offset at a timing where the sheet P passes through the transfer nip during the post-rotation control based on a transfer current during the constant current control of a first operation and a second operation. However, for example, when a width of the sheet P is narrow, the resistance value between the photosensitive drum 122 and the transfer roller 106 decreases. When the constant current control is performed in a case where image formation is performed on such a narrow sheet P, there is a risk that a transfer current may flow excessively due to a low resistance value and an appropriate transfer voltage cannot be applied. In consideration thereof, as the second embodiment, a method of calculating the offset voltage ΔV when the constant current control cannot be performed due to a reason such as a width of sheet being narrow and a transfer current cannot be used to calculate the offset voltage ΔV will be described.

Operation of Engine Control Portion

Figure 6:
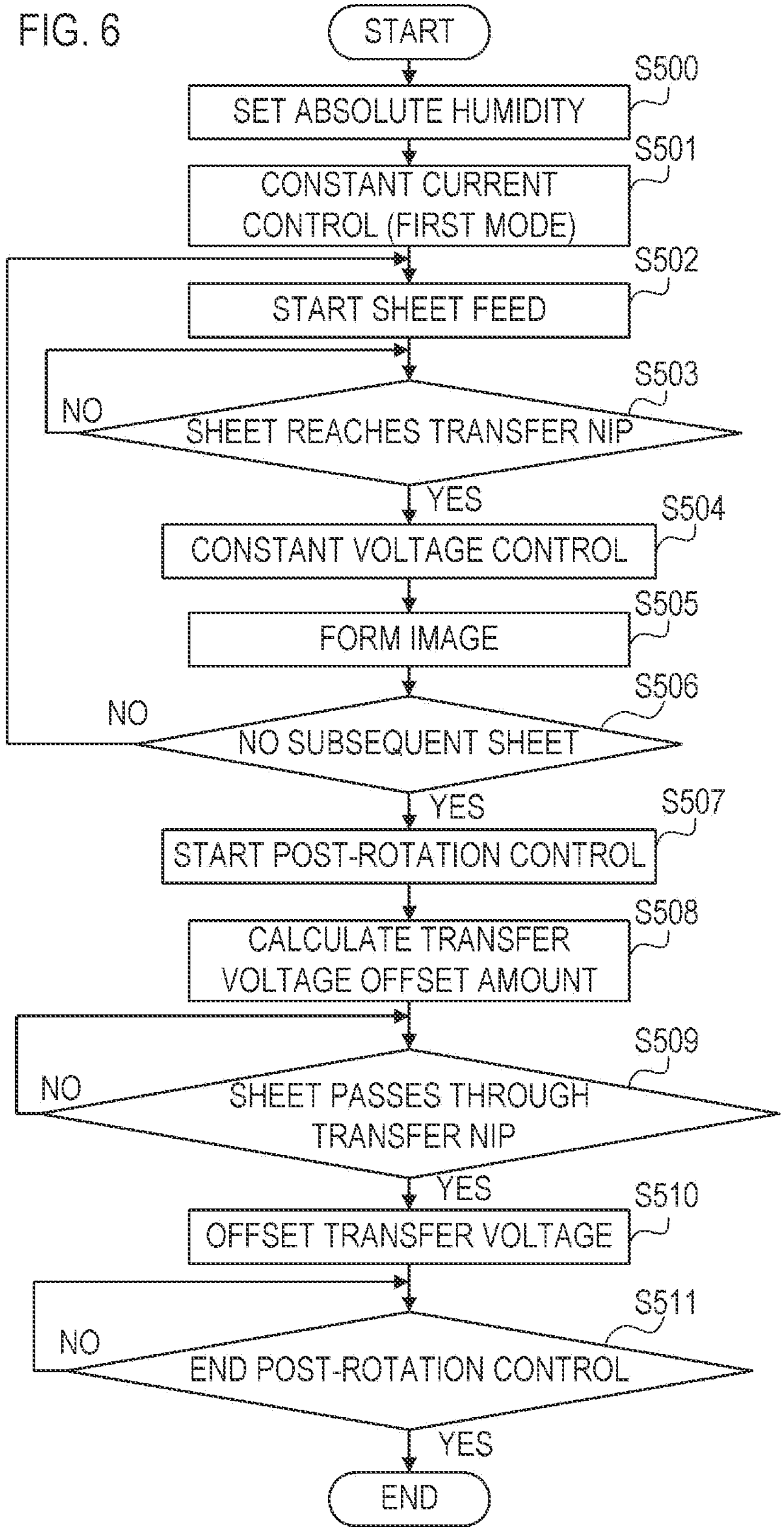
FIG. 6 is a flow chart of operations of a control portion according to a second embodiment.

An operation of the engine control portion 200 when a sheet P (such as B5 or A5 portrait) with a narrow width is fed according to the second embodiment will be described with reference to FIG. 6. FIG. 6 is a flow chart of an operation of the engine control portion 200 from feeding of the sheet P to the end of the post-rotation control according to the second embodiment. In the second embodiment, the engine control portion 200 executes constant voltage control instead of the constant current control during image formation or, in other words, after start of conveyance of the sheet P to the photosensitive drum 122 and the transfer roller 106 until start of the post-rotation control.

After receiving print instructions from the image controller portion 203, in S500, the engine control portion 200 calculates an absolute humidity based on data obtained by the humidity detecting portion 213 and the temperature detecting portion 214. A subsequent operation in which the constant current control is executed under conditions of the first operation and which is from start of sheet feed and culminates with the sheet P reaching the photosensitive drum 122 (S501 to S503) is the same operation as in S400 to S402 of the first embodiment.

Subsequently, in S504, the engine control portion 200 executes the constant voltage control as transfer voltage control for image formation. In the second embodiment, the engine control portion 200 determines a control method based on information such as sheet size and executes the constant voltage control when a width of the sheet P is narrow. A subsequent operation in which image formation is executed and a determination of print instructions of a subsequent sheet is made and which culminates with the start of the post-rotation control (S505 to S507) is the same operation as in S404 to S406 of the first embodiment.

In S508, the engine control portion 200 calculates the offset voltage ΔV as an offset amount of the transfer voltage before the sheet P passes through the transfer nip. In the second embodiment, the offset voltage ΔV is calculated based on the first transfer voltage Va of the transfer voltage during the constant current control acquired in S501, a basis weight of the sheet P designated by the host computer 204 via the image controller portion 203, and the absolute humidity acquired in S500. The engine control portion 200 calculates a coefficient α by a linear interpolation of each parameter based on Table 1 provided below and calculates the offset voltage ΔV according to the following expression (Math. 2) based on the first transfer voltage Va and the coefficient α. The coefficient α is a parameter that is determined based on the absolute humidity and the basis weight. In the second embodiment, for example, when the first transfer voltage Va of the first operation is 1000 V, the basis weight of the sheet P is 100 $g/m^2$, and the absolute humidity is 15 $g/m^3$, the coefficient α is calculated as 90 and the offset voltage ΔV is calculated as 900 V. Note that the acquisition of the coefficient α is not necessarily limited to a calculation by a linear interpolation and the coefficient α can be acquired based on a prescribed set range such as when the basis weight is 60 $g/m^2$, α=101.2 if the absolute humidity ($g/m^3$) is lower than 1 and α=86.5 if the absolute humidity is equal to or higher than 1 and lower than 5. In addition, the calculation of the offset voltage ΔV (S508) is not limited to after the start of the post-rotation control (S507) and, for example, the calculation may be performed at any timing between S505 and S507.

TABLE 1

| Transfer voltage offset coefficient α | | Absolute humidity [$g/m^3$] | | | | |
|---|---|---|---|---|---|---|
| | | 1 | 5 | 15 | 25 | 30 |
| Basis amount [$g/m^2$] | 60 | 101.2 | 86.5 | 73.0 | 62.5 | 55.0 |
| | 70 | 104.7 | 90.0 | 76.5 | 66.0 | 58.5 |
| | 80 | 108.7 | 94.0 | 80.5 | 70.0 | 62.5 |
| | 90 | 113.2 | 98.5 | 85.0 | 74.5 | 67.0 |
| | 100 | 118.2 | 103.5 | 90.0 | 79.5 | 72.0 |
| | 120 | 124.2 | 109.5 | 96.0 | 85.5 | 78.0 |

$$\Delta V = Va \times (\alpha/100) \quad \text{(Math. 2)}$$

Subsequently, an operation in which the rear end of the sheet P completely passes through the transfer nip and the transfer voltage is offset by the offset voltage ΔV and which culminates with the end of the post-rotation control (S509 to S511) is the same as the operation of S408 to S410 in the first embodiment.

As described above, with the configuration according to the second embodiment, the image forming apparatus 100 can calculate the offset voltage ΔV from characteristics of the sheet P and an absolute humidity. Consequently, the offset voltage ΔV can be calculated even when performing the constant current control during image formation is difficult such as when a narrow sheet P is fed.

It should be noted that when applying the present invention, a configuration which satisfies all of the components of each embodiment described above need not necessarily be adopted. In addition, when applying the present invention, processing described as being performed by one apparatus in each embodiment described above may be executed in a shared manner by a plurality of apparatuses. Alternatively, processing described as being performed by different apparatuses may be executed by one apparatus. Which function is to be realized by what kind of a hardware component in a computer system can be flexibly changed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-038052, filed on Mar. 10, 2023, which is hereby incorporated by reference herein in its entirety.

What is claimed is:

1. An image forming apparatus, comprising:

a rotatable image bearing member;

a charging member which charges a surface of the image bearing member;

a developing member which supplies a developer to the image bearing member;

a transfer member which transfers a developer image formed on the surface of the image bearing member onto a recording medium by sandwiching the recording medium with the image bearing member at a sandwiching portion;

a transfer voltage applying portion which applies a transfer voltage to the transfer member; and a control portion which controls the transfer voltage applying portion, wherein the image forming apparatus is capable of executing post-rotation control of removing an electric charge from the surface of the image bearing member in a state that the image bearing member and the developing member rotate while in contact with each other, and wherein in a case that the post-rotation control is started in a state that a recording medium is being conveyed by the image bearing member and the transfer member, i) the control portion controls the transfer voltage applying portion so as to apply a first transfer voltage to the transfer member in a case that the recording medium is being sandwiched between the image bearing member and the transfer member, and ii) the control portion controls the transfer voltage applying portion so as to apply a second transfer voltage to the transfer member that is lower than the first transfer voltage after the recording medium passes through the sandwiching portion.

2. The image forming apparatus according to claim 1, wherein the image forming apparatus further comprises a current detecting portion which detects a current that flows through the transfer member, and wherein the second transfer voltage is determined based on a voltage value and a current value during constant current control, which is executed before a recording medium reaches the sandwiching portion, and a voltage value and a current value during constant current control, which is executed while a developer image is being transferred to the recording medium by the sandwiching portion.

3. The image forming apparatus according to claim 1, wherein the image forming apparatus further comprises a humidity detecting portion which detects an absolute humidity, and wherein the second transfer voltage is determined based on a voltage value during constant current control, which is executed before a recording medium reaches the sandwiching portion, the absolute humidity, and a basis weight of the recording medium.

4. The image forming apparatus according to claim 2, wherein the first transfer voltage is a same value as the transfer voltage during constant current control which is executed before a recording medium reaches the sandwiching portion.

5. The image forming apparatus according to claim 3, wherein the first transfer voltage is a same value as the transfer voltage during constant current control which is executed before a recording medium reaches the sandwiching portion.

6. The image forming apparatus according to claim 3, wherein the control portion switches calculation methods of the second transfer voltage in accordance with characteristics of a recording medium.

7. The image forming apparatus according to claim 1 further comprising:

a charging voltage applying portion which applies a charging voltage to the charging member; and a developing voltage applying portion which applies a developing voltage to the developing member, wherein the control portion controls the charging voltage applying portion and the developing voltage applying portion.

8. The image forming apparatus according to claim 7, wherein the control portion controls the charging voltage applying portion and the developing voltage applying portion so that a potential difference between the developing voltage and a surface potential of the image bearing member becomes a constant value in the post-rotation control.

9. The image forming apparatus according to claim 7, wherein at start of the post-rotation control, the charging voltage and the developing voltage are negative and the transfer voltage is positive.

10. The image forming apparatus according to claim 7, wherein the control portion changes the charging voltage in stages and changes the developing voltage in stages with a lag from the charging voltage in the post-rotation control.

11. The image forming apparatus according to claim 1, wherein the control portion starts the post-rotation control at a timing that a development operation, in which a developer image is developed on the image bearing member by the developing member, ends.

12. The image forming apparatus according to claim 1, wherein the control portion causes, in an image forming operation, the transfer voltage applying portion to apply the first transfer voltage to the transfer member before a recording medium reaches the sandwiching portion and the transfer voltage applying portion to apply a third transfer voltage that is higher than the first transfer voltage to the transfer member after the recording medium reaches the sandwiching portion and while image formation is being performed on the recording medium.

* * * * *